United States Patent
Hintz et al.

(10) Patent No.: US 6,953,629 B2
(45) Date of Patent: Oct. 11, 2005

(54) NICR AND NIFECR SEED LAYERS FOR PERPENDICULAR MAGNETIC RECORDING MEDIA

(75) Inventors: Michael B. Hintz, Mahtomedi, MN (US); Joseph H. Sexton, Oakdale, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 10/609,990

(22) Filed: Jun. 30, 2003

(65) Prior Publication Data

US 2004/0265639 A1 Dec. 30, 2004

(51) Int. Cl.⁷ .............................. G11B 5/66; G11B 5/70
(52) U.S. Cl. ................................ 428/694 TS; 427/131
(58) Field of Search ..................... 428/694 TS, 694 TM, 428/336, 900, 667, 668; 427/131

(56) References Cited

U.S. PATENT DOCUMENTS

| | | |
|---|---|---|
| 5,400,307 A | 3/1995 | Ochiai et al. |
| 5,563,000 A | 10/1996 | Hatwar et al. |
| 5,660,930 A | 8/1997 | Bertero et al. |
| 5,693,200 A | 12/1997 | Tyan et al. |
| 5,731,070 A | 3/1998 | Endo et al. |
| 5,738,927 A | 4/1998 | Nakamura et al. |
| 5,750,270 A | 5/1998 | Tang et al. |
| 5,783,301 A | 7/1998 | Hatwar et al. |
| 5,837,386 A | 11/1998 | Miller et al. |
| 5,846,648 A | 12/1998 | Chen et al. |
| 5,851,363 A | 12/1998 | Miller et al. |
| 6,183,893 B1 * | 2/2001 | Futamoto et al. ...... 428/694 TS |
| 6,248,416 B1 | 6/2001 | Lambeth et al. |
| 6,731,446 B2 * | 5/2004 | Ikeda et al. .................. 360/59 |
| 2001/0033949 A1 | 10/2001 | Abarra et al. |
| 2002/0058161 A1 | 5/2002 | Yamamoto et al. |
| 2002/0182446 A1 * | 12/2002 | Takenoiri et al. ...... 428/694 TS |
| 2003/0091868 A1 | 5/2003 | Shimizu et al. |
| 2003/0170500 A1 * | 9/2003 | Shimizu et al. ...... 428/694 TM |

FOREIGN PATENT DOCUMENTS

| | | |
|---|---|---|
| GB | 2 302 980 | 2/1997 |
| JP | 05-189824 | 7/1993 |
| JP | 6-251441 | 9/1994 |
| JP | 2001-176057 | 6/2001 |

OTHER PUBLICATIONS

Radnoczi et al., "Growth Structure of Thin Films for Perpendicular Magnetic Recording Media," Res. Technol. 35, pp. 707–711, (2000) 6–7.

Gong et al., "Intergranular Coupling and Grain Isolation of Thin Co Films," Mat. Rec. Soc. Symp. Proc., vol. 517, 223 (1998).

Ohmori et al., "Magnetic properties and noise characteristics of Co/Pd multilayer perpendicular magnetic recording media,", Journal of Magnetism and Magnetic Materials, 235, pp. 45–52 (2001).

Sato et al., "Co–Cr–Ta Perpendicular Magnetic Recording Media Using Pt Seed Layer," IEEE Transactions on Magnetics, vol. 36, No. 5, pp. 2387–2389 (2000).

Gong et al., "Highly oriented perpendicular Co–alloy media on Si(111) substrates," Journal of Applied Physics, vol. 85, No. 8, pp. 4699–4701 (1999).

(Continued)

Primary Examiner—Holly Rickman
(74) Attorney, Agent, or Firm—Eric D. Levinson

(57) ABSTRACT

Perpendicular magnetic media are described for use in magnetic recording and data storage. Seed layer compositions are described which can facilitate perpendicular magnetic anisotropy in subsequently deposited magnetic layers. In particular, nickel-iron-chromium (NiFeCr) alloys or nickle-chromium (NiCr) alloys can be used as seed layers which cause a subsequently multi-layered magnetic stack to assume perpendicular magnetic anisotropy. In this manner, high perpendicular magnetic anisotropy can be achieved and storage densities of media may be increased.

21 Claims, 14 Drawing Sheets

OTHER PUBLICATIONS

Roy et al., "Seed–layer effect on the microstructure and magnetic properties of Co/Pd multilayers," Journal of Applied Physics, vol. 89, No. 11, pp. 7531–7533 (2001).

Onoue et al., "CoCrPtTa and Co/Pd Perpendicular Magnetic Recording Media with Amorphous Underlayers," IEEE Transactions on Magnetics, vol. 37, No. 4, pp. 1592–1594 (2001).

Peng et al., "Co/Pd and Co/Pt Multilayers with Indium Tin Oxide Seed Layers and NiFe Soft Underlayers for Perpendicular Magnetic Recording Media," IEEE Transactions on Magnetics, vol. 37, No. 4, pp. 1577–1579 (2001).

Ohmori et al., "Low Noise Co/Pd Multilayer Perpendicular Media with Granular Seed Layer," IEEE Transactions on Magnetics, vol. 36, No. 5, pp. 2384–2386 (2000).

Onoue et al., "Improvement of signal to noise ratio for Co/Pd multilayer perpendicular magnetic recording media by the addition of an underlayer," Journal of Magnetism and Magnetic Materials, 235, pp 40–44 (2001).

Osaka et al., "Proposal of Novel Cobalt–Palladium Media Controlled with C or Si Underlayer for Ultra High Density Magnetic Recording," Waseda University, 3–4–1, Okubo, Shinjuku–ku, Tokyo 169–8555 Japan.

Gong, "Development of Highly Oriented Media Structures for Perpendicular Recording," Thesis submitted to the Department of Electrical and Computer Engineering, Carnegie Mellon University, Pittsburgh, Pennsylvania, Sep. 2000.

* cited by examiner

NICR AND NIFECR SEED LAYERS FOR PERPENDICULAR MAGNETIC RECORDING MEDIA

TECHNICAL FIELD

The invention relates to data storage media and, more particularly, perpendicular magnetic media.

BACKGROUND

Many types of magnetic data storage media have been developed to store information. They include magnetic hard drives, magnetic diskettes, magnetic tapes, magnetic tape cartridges, hybrid magnetic media such as magnetic-optical disks, and the like. Increasing data storage density is a paramount goal in the development of new or improved types of magnetic data storage media. Cost reduction is another goal.

Magnetic media generally function according to ferromagnetic or ferromagnetic principles. For example, the surface of a magnetic medium may be coated with one or more magnetic layers. The local magnetization of magnetic domains defined on the magnetic layers can be selectively oriented to encode data. The local magnetizations can then be detected and interpreted in order to read the recorded data. A hysteresis curve defines how the magnetic domains can be oriented or reoriented in response to application and removal of magnetic fields.

A number of techniques have been developed to increase storage densities and improve quality and reliability of magnetic media. For example, new and improved coatings have been developed over the years in an effort to improve quality and performance of magnetic media. Also, seed layers have been developed to enhance the quality and performance of the subsequently deposited magnetic layers. A seed layer refers to a layer of a magnetic medium that can control or define the crystal texture of subsequently deposited layers. For example, a seed layer may define the crystal phase and the crystalline orientations of subsequently deposited layers, and may improve the magnetic properties of subsequently deposited layers.

Magnetic media can be categorized as longitudinal or perpendicular. Most conventional magnetic media are longitudinal. In longitudinal media, magnetic anisotropy extends parallel to the plane of the medium. In other words, in longitudinal media, the magnetic orientation of individual magnetic domains is generally parallel to the surface of the medium.

In perpendicular media, on the other hand, magnetic anisotropy is perpendicular to the plane of the medium. In other words, in perpendicular media, the magnetic orientation of individual magnetic domains is perpendicular to the medium surface. Perpendicular media allows for a much higher storage density than can be achieved in longitudinal media. Currently, only a limited number of materials have been identified as useful in attaining perpendicular magnetic anisotropy.

SUMMARY

In general, the invention is directed to multi-layered perpendicular magnetic media for use in magnetic recording and data storage. Seed layer compositions are described herein which can facilitate perpendicular magnetic anisotropy in a subsequently deposited multi-layered magnetic stack. In particular, nickel-iron-chromium (NiFeCr) alloys or nickle-chromium (NiCr) alloys can be used as seed layers in order to cause one or more subsequently deposited layers to have a crystalline orientation which improves the perpendicular magnetic anisotropy of a multi-layered magnetic stack. In this manner, high perpendicular magnetic anisotropy can be achieved and storage densities of media may be increased.

In one embodiment, the invention provides a magnetic medium comprising a substrate, a seed layer formed over the substrate, the seed layer including a material selected from a nickel-chromium alloy and a nickel-iron-chromium alloy, and a multi-layered magnetic stack formed over the seed layer and exhibiting perpendicular magnetic anisotropy. The multi-layered magnetic stack includes a plurality of layers each having a thickness of less than or equal to approximately 3 nanometers.

In another embodiment, the invention provides a magnetic storage device comprising a magnetic storage medium, a head to detect magnetic domains on the medium, a controller that controls a position of the head relative to the medium, and a signal processor that interprets detected magnetic domains. The magnetic storage medium includes a substrate, a seed layer formed over the substrate that includes one of a nickel-chromium alloy and a nickel-iron-chromium alloy, and a multi-layered magnetic stack formed over the seed layer and exhibiting perpendicular magnetic anisotropy.

In another embodiment, the invention provides a method comprising forming a seed layer that includes one of a nickel-chromium alloy and a nickel-iron-chromium alloy over a substrate, and forming a multi-layered magnetic stack over the seed layer to exhibit perpendicular magnetic anisotropy.

The invention may be capable of providing several advantages. For example, perpendicular magnetic media according to the invention may achieve higher storage densities than conventional longitudinal media. The structures and compositions described below may also provide improved stability against thermal decay relative to some conventional longitudinal and other perpendicular recording media. Also, the invention may provide compatibility with low temperature thin film processing. Low temperature thin film processing, in turn, can allow plastic substrates to be used, which may reduce the costs associated with media. The invention can be used to improve the anisotropy, coercivity, and crystal texture, including the crystal phase and the crystalline orientation, of various layers of magnetic media.

Additional details of these and other embodiments are set forth in the accompanying drawings and the description below. Other features, objects and advantages will become apparent from the description and drawings, and from the claims.

DETAILED DESCRIPTION

The invention is directed to perpendicular magnetic media. Perpendicular magnetic media refers to magnetic media in which anisotropy is perpendicular to the major surface of the medium. In contrast, longitudinal media refers to magnetic media in which magnetic anisotropy is generally parallel to the major surface of the medium. Perpendicular media allows for a much higher storage density than can be achieved in longitudinal media. Perpendicular magnetic media are described that include one or more magnetic layers having anisotropy that is perpendicular to the surface of the medium. More specifically, seed layers are described which can lead to perpendicular magnetic anisotropy in the subsequently deposited magnetic layers.

In accordance with the invention, nickel-iron-chromium (NiFeCr) alloys or nickel-chromium (NiCr) alloys can be used as seed layers which cause one or more subsequently deposited magnetic layers to assume perpendicular magnetic anisotropy. The subsequently deposited magnetic layers may comprise a multi-layered magnetic stack (also referred to as magnetic multi-layered thin films or magnetic multi-layers). For example, a multi-layered magnetic stack may comprise a cobalt-platinum (Co/Pt) multi-layered thin film, a cobalt-palladium (Co/Pd) multi-layered thin film, or the like.

In this disclosure, the phrase multi-layered stack refers to a collection of layers having individual layer thicknesses of less than approximately 3 nanometers. Such a multi-layered stack is also sometimes referred to as a nano-layered stack. For example, the multi-layered stack may comprise a stack of two or more materials, each deposited to a thickness less than approximately 3.0 nanometers. The individual layers of the multi-layered stack may be deposited in an alternating configuration. If desired, an additional seed layer comprising one of the materials of the multi-layered stack, but having a thickness greater than 3 nanometers, may also be deposited over the seed layer of nickel-iron-chromium (NiFeCr) alloy or nickel-chromium (NiCr) alloy prior to deposition of the alternating layers of the multi-layered stack. For example, if a Co/Pt multi-layered stack is used, a seed layer of platinum may be deposited over the nickel-iron-chromium (NiFeCr) alloy or nickel-chromium (NiCr) alloy prior to deposition of the alternating layers of the multi-layered stack. Similarly, if a Co/Pd multi-layered stack is used, a seed layer of palladium may be deposited over the nickel-iron-chromium (NiFeCr) alloy or nickel-chromium (NiCr) alloy prior to deposition of the alternating layers of the multi-layered stack.

Figure 1:
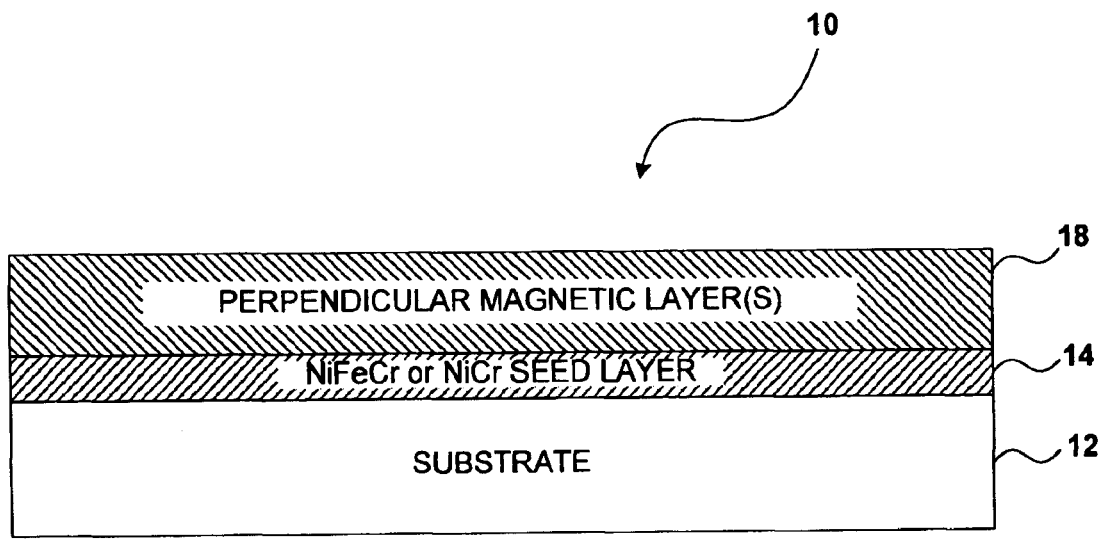
FIGS. 1–4 are enlarged cross-sectional side views of an exemplary magnetic recording media according to embodiments of the invention.

FIG. 1 is an enlarged cross-sectional side view of an exemplary magnetic recording medium 10 according to an embodiment of the invention. By way of example, magnetic recording medium 10 can correspond to a magnetic hard disk, a magnetic diskette, magnetic tape, or the like. In any case, magnetic medium 10 includes a substrate 12, and a seed layer 14 of either a nickel-iron-chromium (NiFeCr) alloy or a nickel-chromium (NiCr) alloy formed over substrate 12. One or more perpendicular magnetic layers 18 exhibiting perpendicular magnetic anisotropy are formed over seed layer 14. Again, in accordance with the invention, magnetic layers 18 may comprise a multi-layered magnetic stack, or the like.

The various layers can be deposited upon one another during the media fabrication process using any of a wide variety of conventional deposition techniques. Example deposition techniques include e-beam evaporation, various forms of sputtering such as magnetron sputtering, ion beam sputtering, or the like. Additionally, other layers such as a buffer layer between the substrate 12 and seed layer 14 may be included. Also, a soft magnetic underlayer, such as a layer of permalloy, may be provided between the substrate 12 and seed layer 14.

As described in greater detail below, the seed layer 14 of either a nickel-iron-chromium (NiFeCr) alloy or a nickel-chromium (NiCr) alloy can improve the crystal texture of perpendicular magnetic layers 18. In this manner, high perpendicular magnetic anisotropy can be achieved and storage densities can be increased. If desired, additional layers may be added over the perpendicular magnetic layers 18, such as one or more barrier layers, a hard coat, or a lubrication layer, e.g., to improve medium rigidity or stability, or to improve head flyability.

Substrate 12 may comprise glass, plastic, organic resin, metal, or any other suitable substrate material. The described structures and compositions may be particularly useful when plastic substrates are used because high temperatures required for creation of some conventional media can be avoided. In other words, the invention may realize perpendicular magnetic anisotropy on a medium that includes a plastic substrate. The use of plastic as a substrate material is advantageous because it can be thermally injection-molded quickly and easily, and can be formed at relatively low cost. In accordance with the invention, perpendicular magnetic media can be created by deposition processes carried out at temperatures less than 50 degrees Celsius, less than 40 degrees Celsius, or even less than 30 degrees Celsius. In some cases, media can be created by deposition processes performed at room temperature, i.e., at or near approximately 24 degrees Celsius.

The seed layer 14 of either a nickel-iron-chromium (NiFeCr) alloy or a nickel-chromium (NiCr) may define a thickness in the range of 1 and 40 nanometers and more preferably between 2 and 10 nanometers. If a nickel-iron-chromium (NiFeCr) alloy is used for seed layer 14, the layer may comprise greater than approximately 30 atomic percent nickel and greater than 10 atomic percent iron. In one example, a nickel-iron-chromium (NiFeCr) layer comprises approximately 43 atomic percent nickel, approximately 11 atomic percent iron, and approximately 46 atomic percent chromium. If a nickel-chromium (NiCr) alloy is used for seed layer 14, the layer may comprise greater than approximately 30 atomic percent nickel, e.g., approximately 40 atomic percent nickel and approximately 60 atomic percent chromium.

Figure 2:
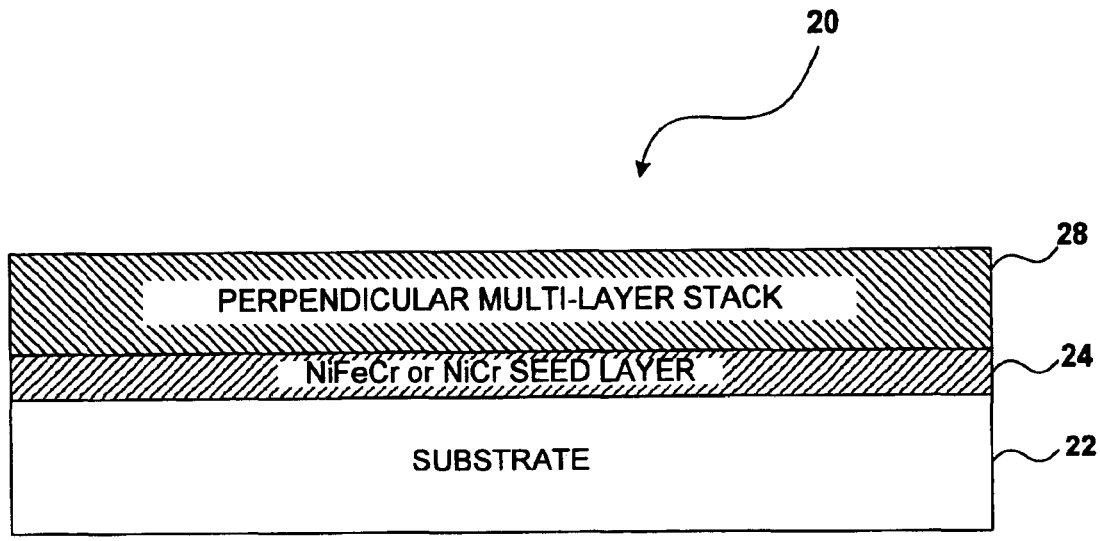

FIG. 2 is a cross-sectional side view of a portion of an exemplary magnetic recording medium according to another embodiment of the invention. As shown, medium 20 includes a substrate 22 and a seed layer 24 of either a nickel-iron-chromium (NiFeCr) alloy or a nickel-chromium (NiCr) alloy formed over substrate 20. A multi-layered magnetic stack 28 exhibiting perpendicular magnetic anisotropy is formed over seed layer 24. Additional layers may also be included over, under or between seed layer 24 and multi-layered magnetic stack 28.

The phrase multi-layered stack refers to a collection of layers having individual layer thicknesses of less than approximately 3 nanometers. Such a multi-layered stack is sometimes referred to as a nanolayered stack. For example, the multi-layered stack may comprise a stack of two or more materials, each deposited to a thickness less than approximately 3.0 nanometers. For example, the individual layers may be deposited in an alternating configuration. If desired, an additional seed layer comprising one of the materials of the multi-layered stack, but having a thickness greater than 3 nanometers, may also be deposited over the seed layer of nickel-iron-chromium (NiFeCr) alloy or nickel-chromium (NiCr) alloy prior to deposition of the alternating layers of the multi-layered stack.

The seed layer 24 of nickel-iron-chromium (NiFeCr) alloy or nickel-chromium (NiCr) alloy may be deposited at room temperature to a thickness of approximately 2.5 nm. Again, such low temperature deposition can allow for use of plastic materials for substrate 22. Each individual layer of perpendicular multi-layered stack 28 may have a layer thickness of between approximately 0.1 and 3.0 nanometers. In one example, two materials are used for the multi-layered stack, and an alternating configuration defines pairs of layers in the stack. In that case, the number of pairs in the multi-layered stack may be between 5 and 50, although the invention is not necessarily limited in that respect. In other cases, three or more different layers may define a period of the multi-layered stack. A period is analogous to a pair of layers in a stack, but may include three or more different layers each deposited to a thickness less than approximately 3.0 nanometers.

Figure 3:
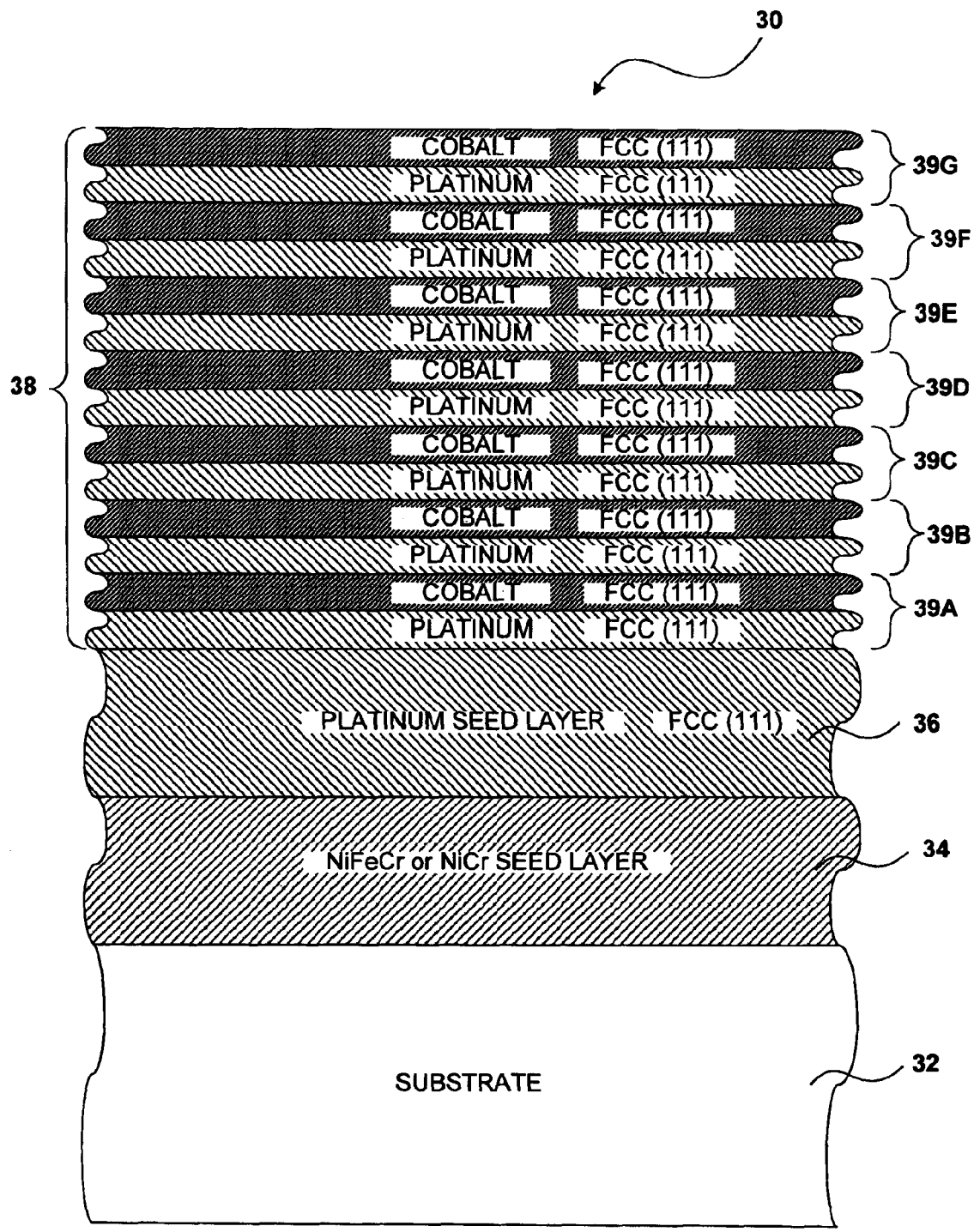

FIG. 3 is a cross-sectional side view of a portion of magnetic recording medium that includes a perpendicular multi-layered magnetic stack according to an embodiment of the invention. As shown, medium 30 includes a substrate 32 and a seed layer 34 of either a nickel-iron-chromium (NiFeCr) alloy or a nickel-chromium (NiCr) alloy formed over substrate 30. A multi-layered magnetic stack 38 exhibiting perpendicular magnetic anisotropy is formed over seed layer 34. Additional layers may also be included, such as seed layer 36 comprising one of the materials of multi-layered magnetic stack 38, in this case, platinum.

The various layers of multi-layered stack 38 are labeled to describe the crystal texture. The term "crystal texture" refers collectively to the crystal phase and the crystalline orientation of a layer. The seed layer of platinum 36 may include face centered cubic (FCC) crystallites in a (111) orientation. In other words, the crystal phase of the platinum seed layer 36 is FCC and the crystalline orientation is (111). In some cases, the seed layer of platinum 36 consists essentially of face centered cubic (FCC) crystallites in a (111) orientation. The seed layer 34 of either a nickel-iron-chromium (NiFeCr) alloy or a nickel-chromium (NiCr) alloy facilitates such crystal texture of the seed layer of platinum 36. For example, seed layer 34 of nickel-iron-chromium or nickel-chromium may be deposited to a thickness of approximately 2.5 nm.

The perpendicular multi-layered magnetic stack 38 may comprise pairs 39A–39G (sometimes referred to as periods) of alternating layers of platinum and cobalt including face centered cubic (FCC) crystallites in a (111) orientation. In some cases, the pairs 39A–39G of alternating layers of platinum and cobalt consist essentially of face centered cubic (FCC) crystallites in a (111) orientation.

The layers of platinum in the multi-layered stack may define a thickness between approximately 0.5 and 2.5 nanometers, such as a thickness of approximately 1.0 nanometer, and the layers of cobalt in the multi-layered stack may define a thickness between approximately 0.15 and 1.0 nanometers, such as a thickness of approximately 0.35 nanometer. The number of pairs 39 of alternating layers of platinum and cobalt may be between 5 and 50 inclusive, or more specifically between 9 and 20 inclusive. For example, 18 pairs of alternating layers of platinum and cobalt may be used. The overall thickness of multi-layered stack 38 may be in the range of approximately 5 to 50 nanometers. For simplicity in the illustrated example, however, seven pairs 39A–39G of alternating layers of platinum and cobalt are shown.

Figure 4:
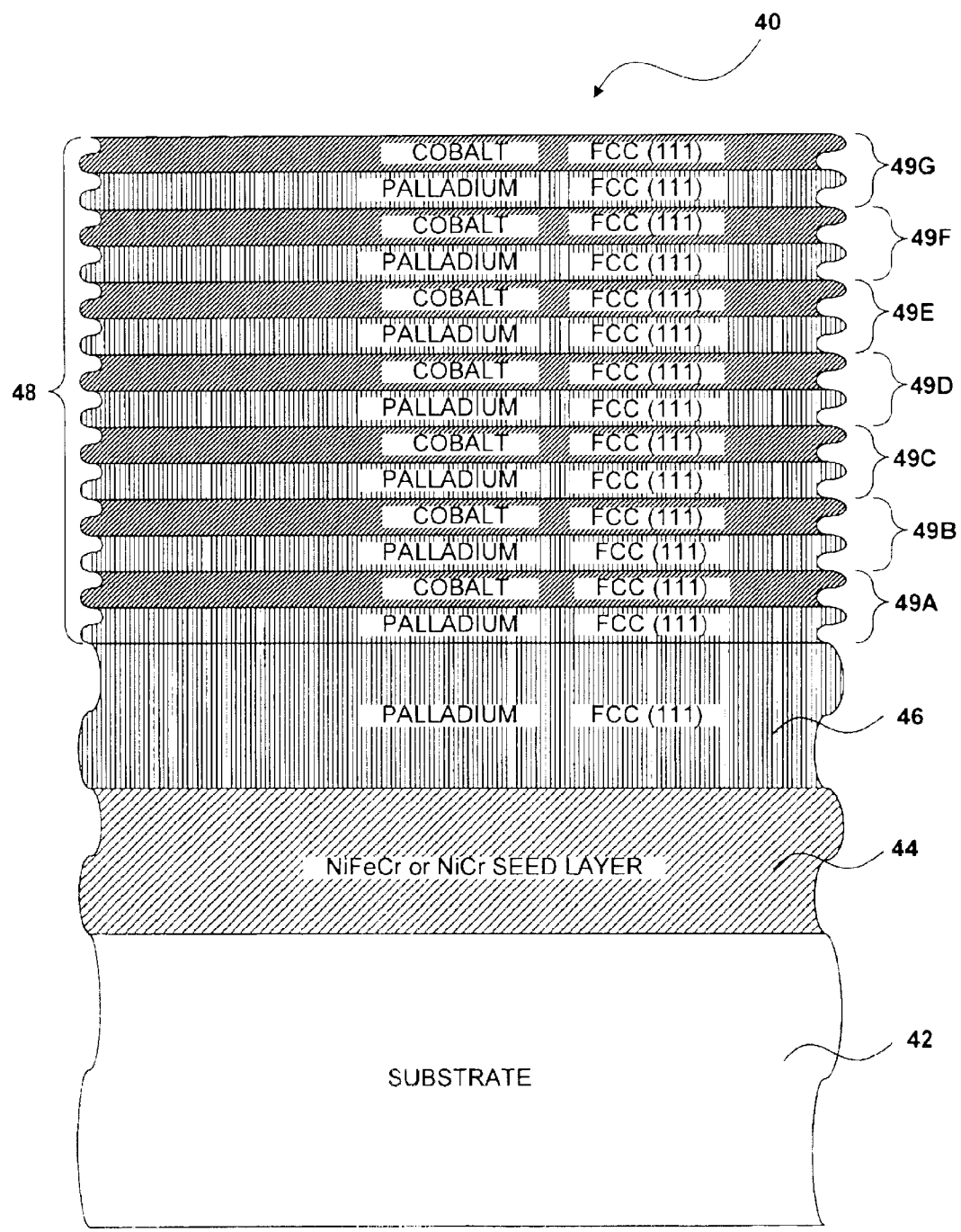

FIG. 4 is a cross-sectional side view of a portion of magnetic recording medium that includes a perpendicular multi-layered magnetic stack according to an embodiment of the invention. As shown, medium 40 includes a substrate 42 and a seed layer 44 of either a nickel-iron-chromium (NiFeCr) alloy or a nickel-chromium (NiCr) alloy formed over substrate 40. A multi-layered magnetic stack 48 exhibiting perpendicular magnetic anisotropy is formed over seed layer 44. Additional layers can also be included, such as seed layer 46 comprising one of the materials of multi-layered magnetic stack 48, in this case, palladium.

In the example of FIG. 4, the multi-layered magnetic stack includes pairs 49A–49G of alternating layers of palladium and cobalt. In that case, the layers of palladium in multi-layered stack 48 may define a thickness between approximately 0.3 and 1.8 nanometers, and the layers of cobalt in multi-layered stack 48 may define a thickness between approximately 0.15 and 1.0 nanometer. The number of pairs 49 of alternating layers of palladium and cobalt may be between 5 and 50 inclusive. The overall thickness of multi-layered stack 48 may be in the range of approximately 5 to 50 nanometers. For simplicity, however, seven pairs 49A–49G of alternating layers of palladium and cobalt are illustrated.

As labeled in FIG. 4, the seed layer of palladium 46 comprises face centered cubic (FCC) crystallites in a (111) orientation and may consist essentially of such a crystal texture. Seed layer 44 of either a nickel-iron-chromium (NiFeCr) alloy or a nickel-chromium (NiCr) alloy facilitates such crystal texture of the seed layer of palladium 44. For example, seed layer 44 of nickel-iron-chromium or nickel-chromium may be deposited to a thickness of approximately 2.5 nm.

The multi-layered magnetic stack 48 may comprise pairs 49A–49G of alternating layers of palladium and cobalt including face centered cubic (FCC) crystallites in a (111) orientation. In some cases, the pairs 48A–48G of alternating layers of palladium and cobalt consist essentially of face centered cubic (FCC) crystallites in a (111) orientation.

Figure 5:
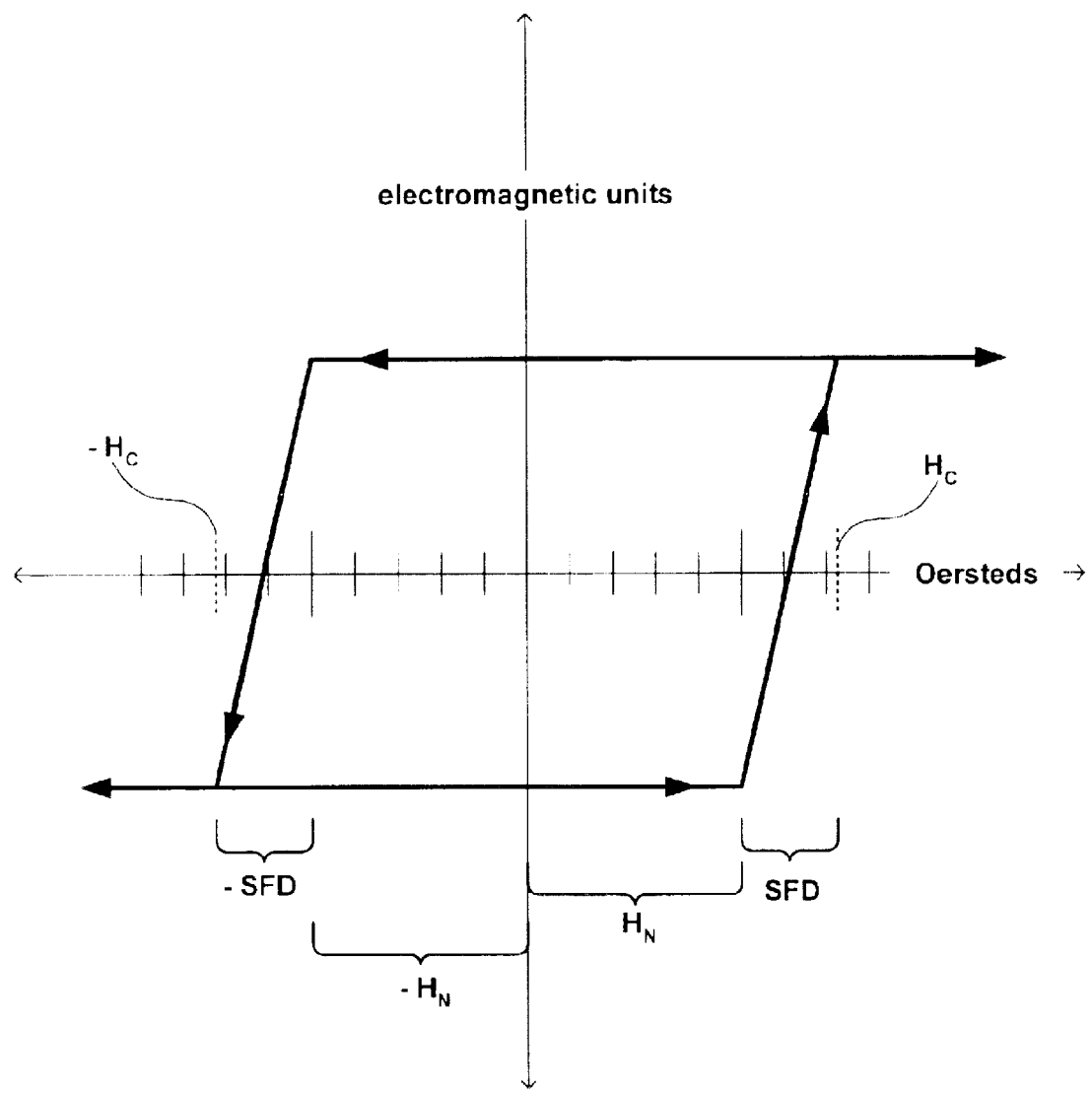
FIG. 5 is a graph of a hysteresis curve used to explain various qualities of media conforming to one or more embodiments described herein.

In still other embodiments, a medium can include seed layers of nickel-iron-chromium or nickel-chromium followed by platinum, followed by a multi-layered stack that includes alternating layers of palladium and cobalt. Also, a medium may include seed layers of nickel-iron-chromium or nickel-chromium followed by palladium, followed by a multi-layered stack that includes alternating layers of platinum and cobalt. In other words, palladium and platinum may be substituted for one another in various different embodiments. In some cases, a palladium-platinum alloy may be used in a multi-layered stack. During deposition of the multi-layered stack, the cobalt may be deposited first, or alternatively the palladium or platinum may be deposited first as shown in FIGS. 4 and 5. These and other modifications will become apparent in light of this disclosure.

FIG. 5 is a graph of a hysteresis curve illustrating various qualities of media conforming to one or more embodiments described herein. In particular, media described herein may exhibit a coercivity ($H_c$) between approximately 2000 and 10,000 Oersteds. Coercivity refers to the magnetic field strength needed to reverse a given magnetization. For example, magnetic recording media as described herein may exhibit a coercivity greater than approximately 2000 Oersteds, greater than approximately 3000 Oersteds, greater than approximately 3500 Oersteds, greater than approximately 5000 Oersteds, or greater than approximately 5500 Oersteds. High coercivity may improve magnetic stability and reliability of the media.

Additionally, the media described herein may exhibit a hysteresis curve having a switching field distribution (SFD) less than 30 percent of its coercivity ($H_c$), and a nucleation field ($H_N$) greater than 80 percent of its coercivity (Hc). The switching field distribution refers to the interval of magnetic field strength over which a given magnetization can be completely reversed. M(H) in the switching field, i.e., the slope of the hysteresis curve in the SFD, may change linearly as illustrated in FIG. 5, or non-linearly. The nucleation field refers to the point of magnetic field strength when the magnetization begins to switch. Large nucleation fields relative to the coercivity may improve magnetic stability and reliability of media.

Figure 6:
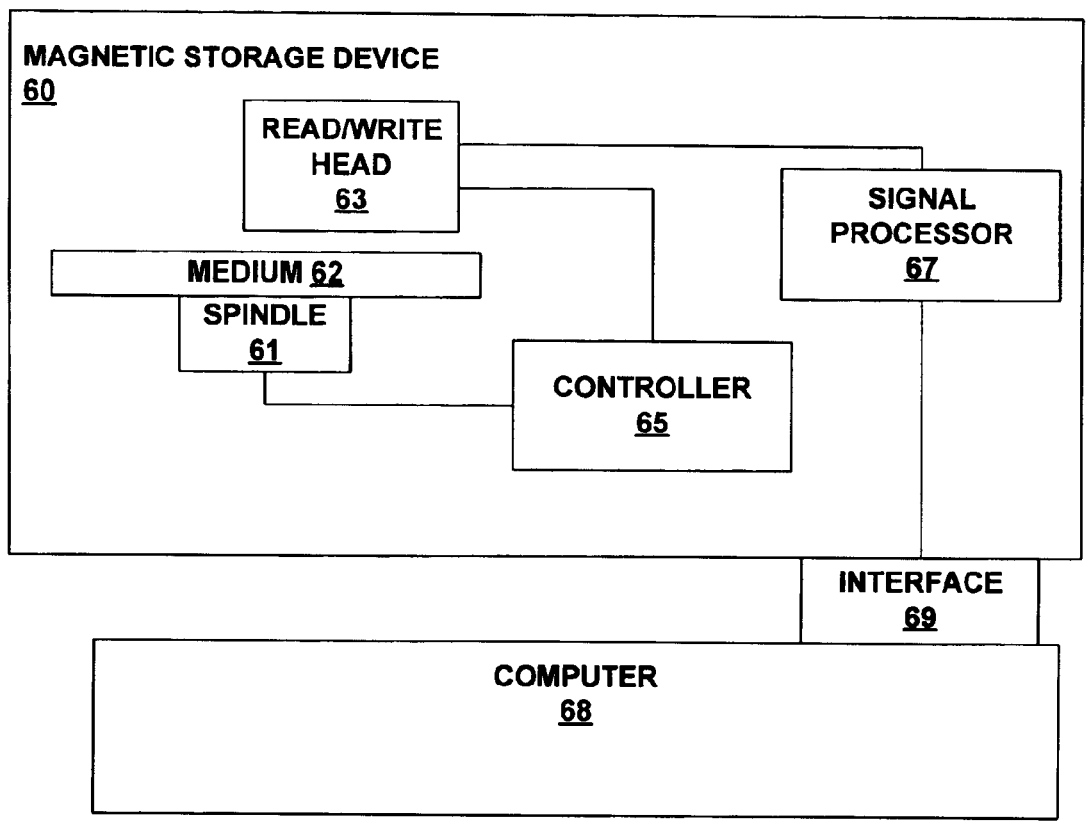
FIGS. 6 and 7 are exemplary block diagrams of magnetic storage devices that may be used to read or write data to media in accordance with embodiments of the invention.
Figure 7:
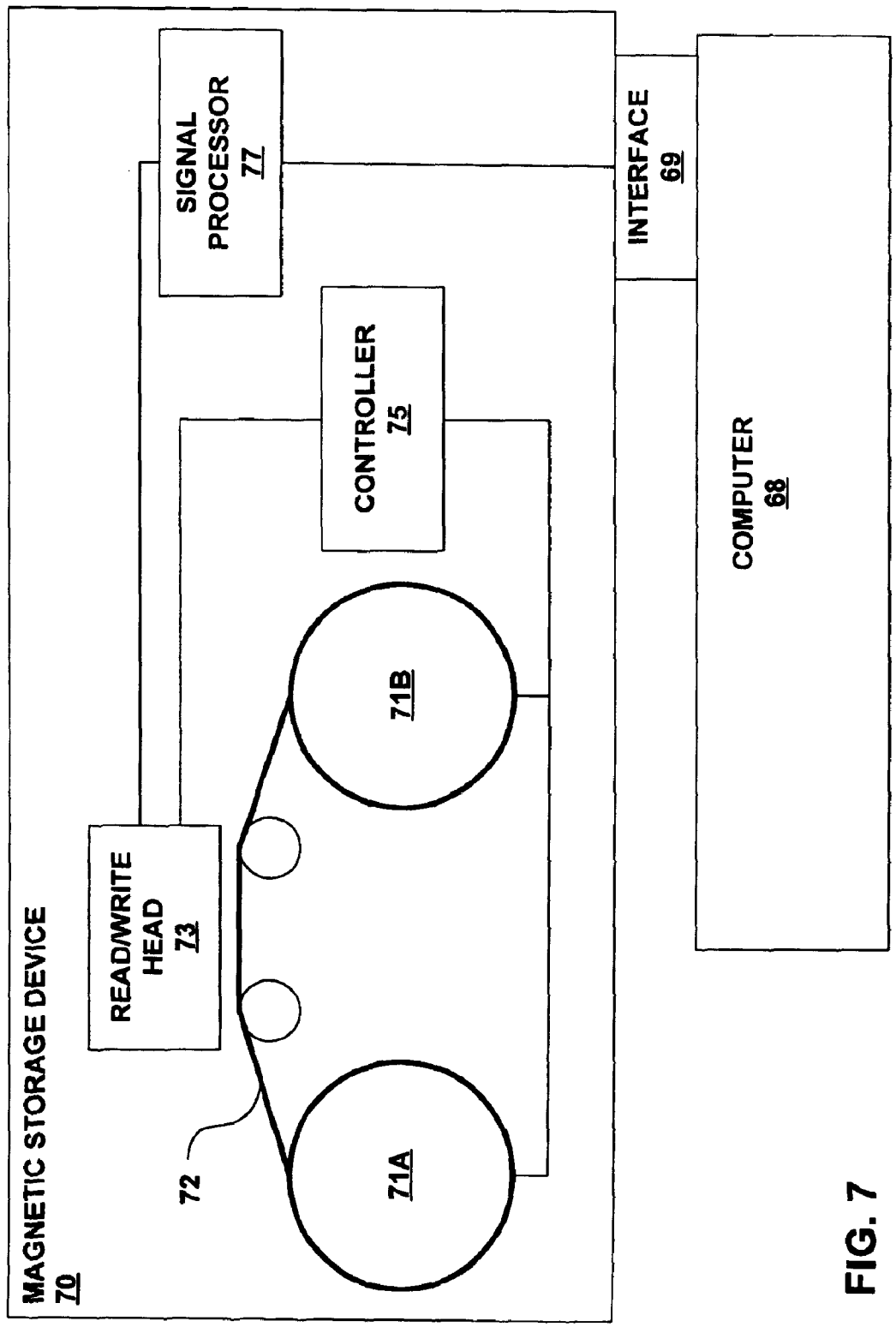

FIGS. 6 and 7 are block diagrams of exemplary magnetic storage devices that may be used to read or record data on media described herein. As shown in FIG. 6, magnetic storage device 60 may be used with a disk shaped medium 62, which corresponds to one of the media described above. Magnetic storage device 60 may comprises a magnetic disk drive, a hard disk drive, a floppy disk drive, or the like. The magnetic storage medium 62 includes a substrate, a nickel-chromium alloy layer or nickel-iron-chromium alloy layer formed over the substrate, and one or more layers, including a magnetic multi-layer exhibiting perpendicular magnetic anisotropy, formed over the nickel-chromium alloy layer.

Spindle 61 spins medium 62 and read/write head 63 is positioned to detect magnetic domains on medium 62. A controller 65 controls spindle 61 and read/write head 63 to precisely position read write head 63 relative to medium 62. A signal processor 67 interprets detected magnetic domains.

As illustrated in FIG. 6, magnetic storage device 60 can be coupled to a computer 68 via an interface 69. For example, computer 68 may comprise a central processing unit for any of a variety of computer devices, including, for example, a PC, a Macintosh, a computer workstation, a handheld data terminal, a handheld computer, a cell phone, digital paper, a digital television, a wireless device (in which case interface 69 may be wireless), a personal digital assistant, a laptop computer, a desktop computer, a digital camera, a digital recording device, or the like.

As shown in FIG. 7, magnetic storage device 70 may be used with a medium 72, which corresponds to one of the media described above. Medium 72 comprises magnetic tape, and magnetic storage device 70 comprises a magnetic tape drive, a magnetic tape cartridge drive, or the like. Medium 72 includes magnetic tape spooled onto one or more spools 71A and 71B. Spools 71 may be housed in a cartridge, although the invention is not limited in that respect. The magnetic storage medium 72 in the form of magnetic tape includes a substrate, a nickel-chromium alloy layer or nickel-iron-chromium alloy layer formed over the substrate, and one or more magnetic layers formed over the nickel-chromium alloy layer and exhibiting perpendicular magnetic anisotropy.

Read/write head 73 can be positioned to detect magnetic domains on medium 72. A controller 75 controls the positioning of read/write head 73 as well as the movement of medium 72 such as by turning spools 71A and/or 71B to precisely position read/write head 73 relative to medium 72. A signal processor 77 interprets detected magnetic domains. Like in FIG. 6, magnetic storage device 70 of FIG. 7 may be coupled to a computer 68 via an interface 69.

Figure 8:
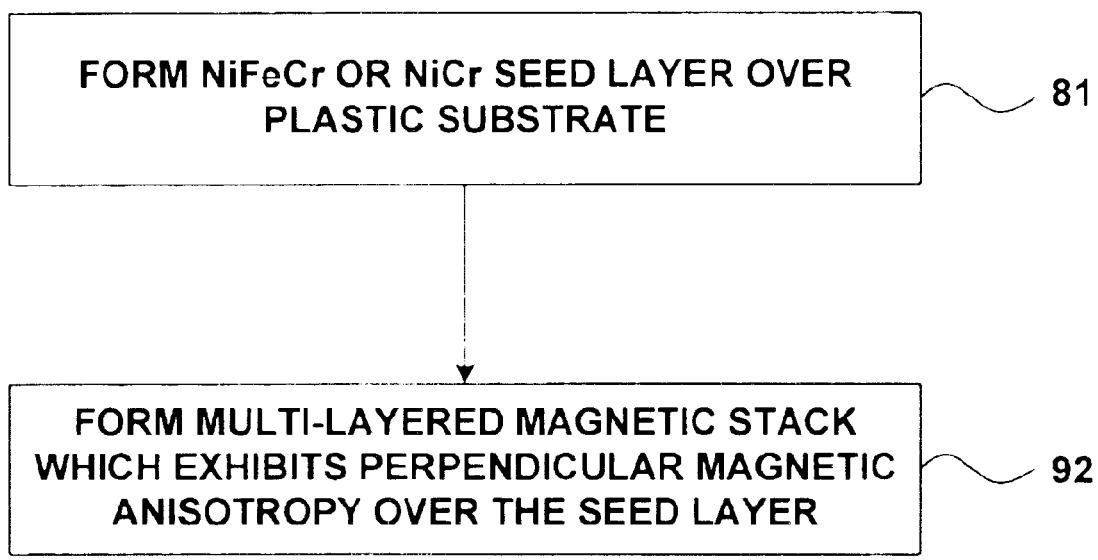
FIG. 8 is a flow diagram illustrating a method of manufacture of media according to embodiments of the invention.

FIG. 8 is a flow diagram illustrating a method of manufacture of media according to embodiments of the invention. As shown in FIG. 8, a seed layer of either a nickel-iron-chromium (NiFeCr) alloy or a nickel-chromium (NiCr) alloy is formed over a plastic substrate (81). A multi-layered magnetic stack which exhibits perpendicular magnetic anisotropy is then formed over the seed layer (92). In accordance with the invention, the seed layer of either a nickel-iron-chromium (NiFeCr) alloy or a nickel-chromium (NiCr) alloy seeds the growth of the magnetic multi-layers which exhibit perpendicular magnetic anisotropy. Again, additional layers, such as an additional seed layer, or one or more buffer layers may also be deposited prior to deposition of the multi-layered magnetic stack. Also, additional layers may be deposited over the multi-layered magnetic stack, such as a hard coat, or lubrication layer.

The invention may be capable of providing a number of advantages. In particular, perpendicular magnetic media in accordance with the invention may achieve higher storage densities than conventional longitudinal media. Also, the structures and compositions described below may provide improved stability against thermal decay relative to some conventional media. In addition, the invention may provide compatibility with low temperature thin film deposition processes. Lower temperature thin film deposition processes, in turn, allow plastic substrates to be used, which can reduce the cost of media. The invention can be used to improve crystal texture of media, such as by improving the crystal phase and the crystalline orientation of various layers specifically for achieving perpendicular magnetic anisotropy.

The invention may also be used to improve the coercivity, the switching field distribution, and/or the nucleation field of media as shown and described with reference to the graph of FIG. 5. In short, in accordance with the invention, improved perpendicular media can be realized. The following examples provide additional details of media in accordance with embodiments of the invention.

EXAMPLES

The thin films of the following examples were coated in a high vacuum sputtering system equipped with a planetary. The planetary was made to revolve about its major axis, passing the substrate opposite the sputter sources in the system in a repetitive fashion, or, was made to fix the substrate at a position directly opposite a specified sputter source for a designated time interval. In both modes of operation the substrate was always made to spin around its own minor axis. The sputter sources used in all of the examples were DC magnetrons. The sources in the system included NiFeCr, C, two Co sources, and two Pt sources. The C and Co sputter sources were 6" in diameter. The Pt and NiFeCr sources were 3" in diameter.

Argon (Ar) was used as the sputtering gas in all of the examples. The distance from the front of a sputter source cathode to a substrate directly opposite the source was 10 cm. In all of the examples, the deposited layer thicknesses were controlled by controlling the timing of the exposure of the substrate to the sputter sources while operating the sources at pre-calibrated operating conditions at the given pressure. M(H) measurement results were obtained using an ADE Technologies DMS Model 880 VSM (vibrating sample magnetometer.) X-ray diffraction results were obtained using a Rigaku DMAX 2200 x-ray diffractometer.

Example 1

Five flat polycarbonate substrates were mounted onto the planetary sample plattens of the high vacuum sputtering system. The system was then pumped to a base pressure of 4.7 E-8 Torr. The substrates were first positioned, in sequence, directly opposite the NiFeCr source and were spun on their own axis while operating the NiFeCr source at pre-calibrated powers and times to deposit layer thicknesses of 0, 10, 25, 50, and 400 Å on the respective substrates. The Ar pressure during the NiFeCr depositions was 2 mT. The NiFeCr composition was: 43 atomic percent Ni, 11 atomic percent Fe, and 46 atomic percent Cr. Each of the five substrates was then positioned, in sequence, directly opposite the Pt source and spun on their respective axis while operating the Pt source using a pre-calibrated power and time to achieve a 200 Å Pt layer thickness on each of the substrates. The Ar pressure during deposition of the Pt layers was 2 mT.

Finally a carbon hardcoat was deposited on all of the samples at a major axis speed of 0.4 rev/sec and minor axis speed of 3.2 rev/sec while the C source was operated at a pre-calibrated power and time to result in a layer thickness of 60 Å. The resulting sample construction was: substrate |NiFeCr|200 Å Pt|60 Å C. X-ray diffraction (XRD) measurements were made on each of the samples using the same spectrometer power, step size, and dwell time for each sample. The XRD results are summarized in FIG. 9.

Figure 9:
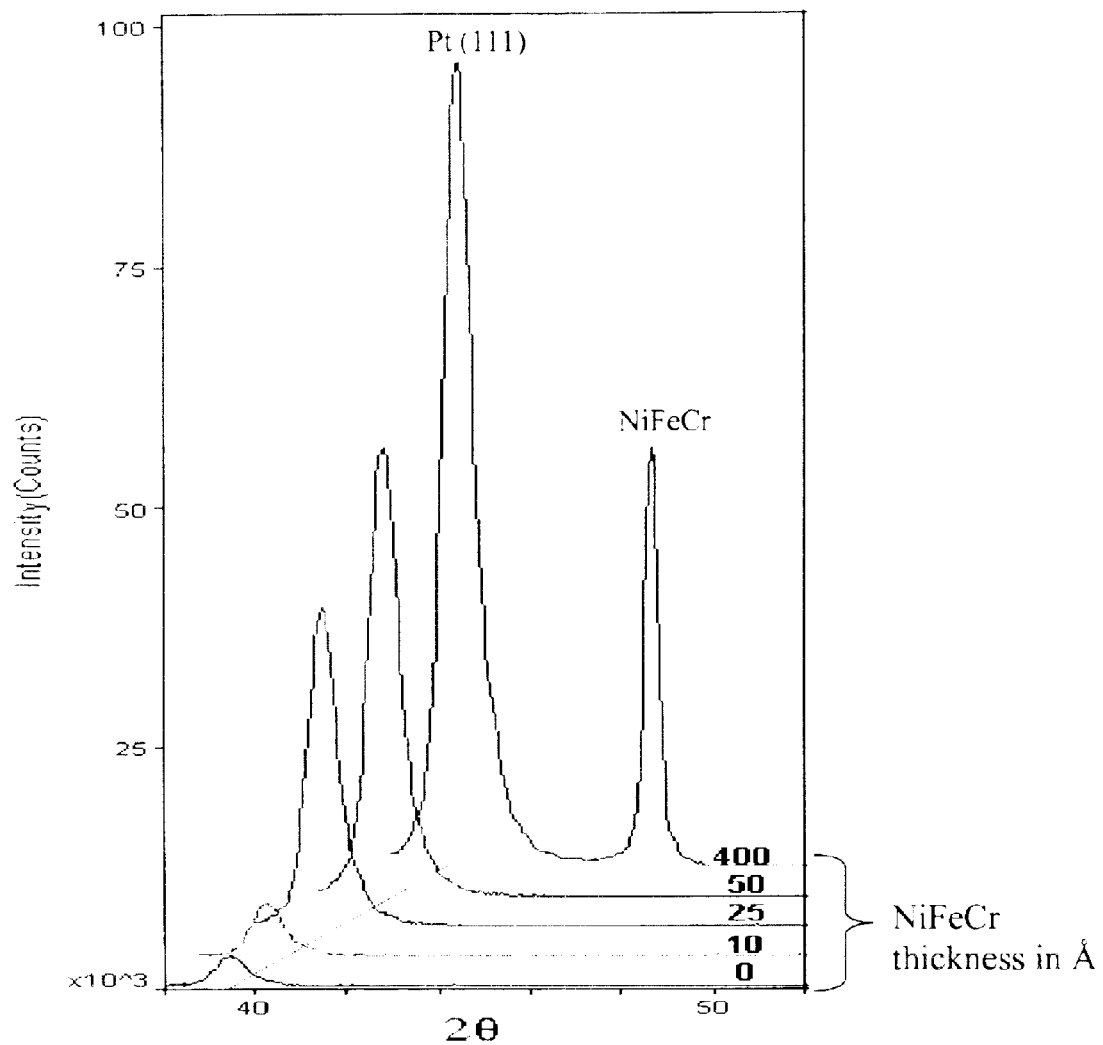
FIG. 9 is a graph illustrating x-ray diffraction measurements of a medium according to an embodiment of the invention.
Figure 10:
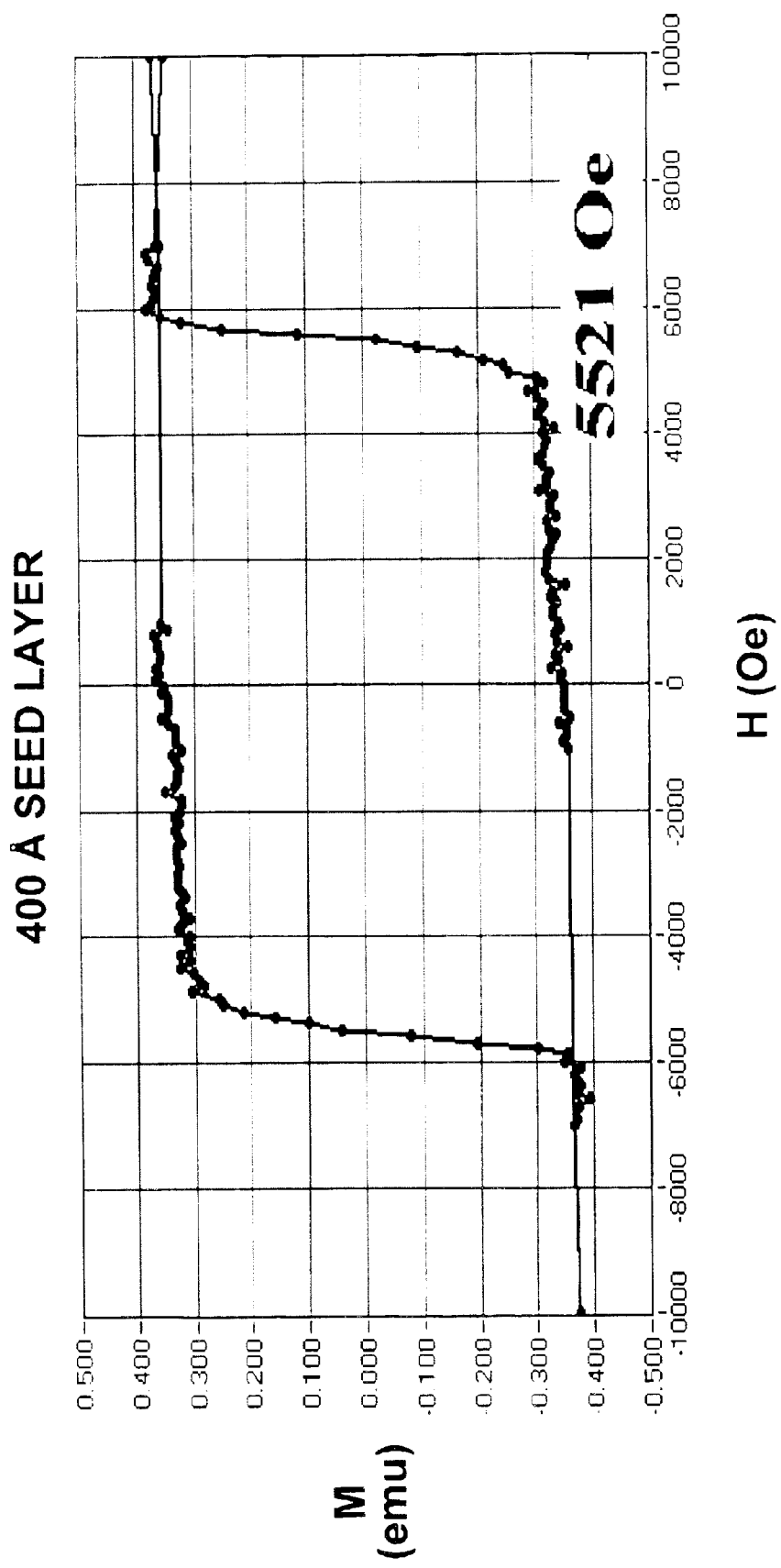
FIGS. 10–14 are graphs illustrating hysteresis curves of media according to embodiments of the invention.
Figure 11:
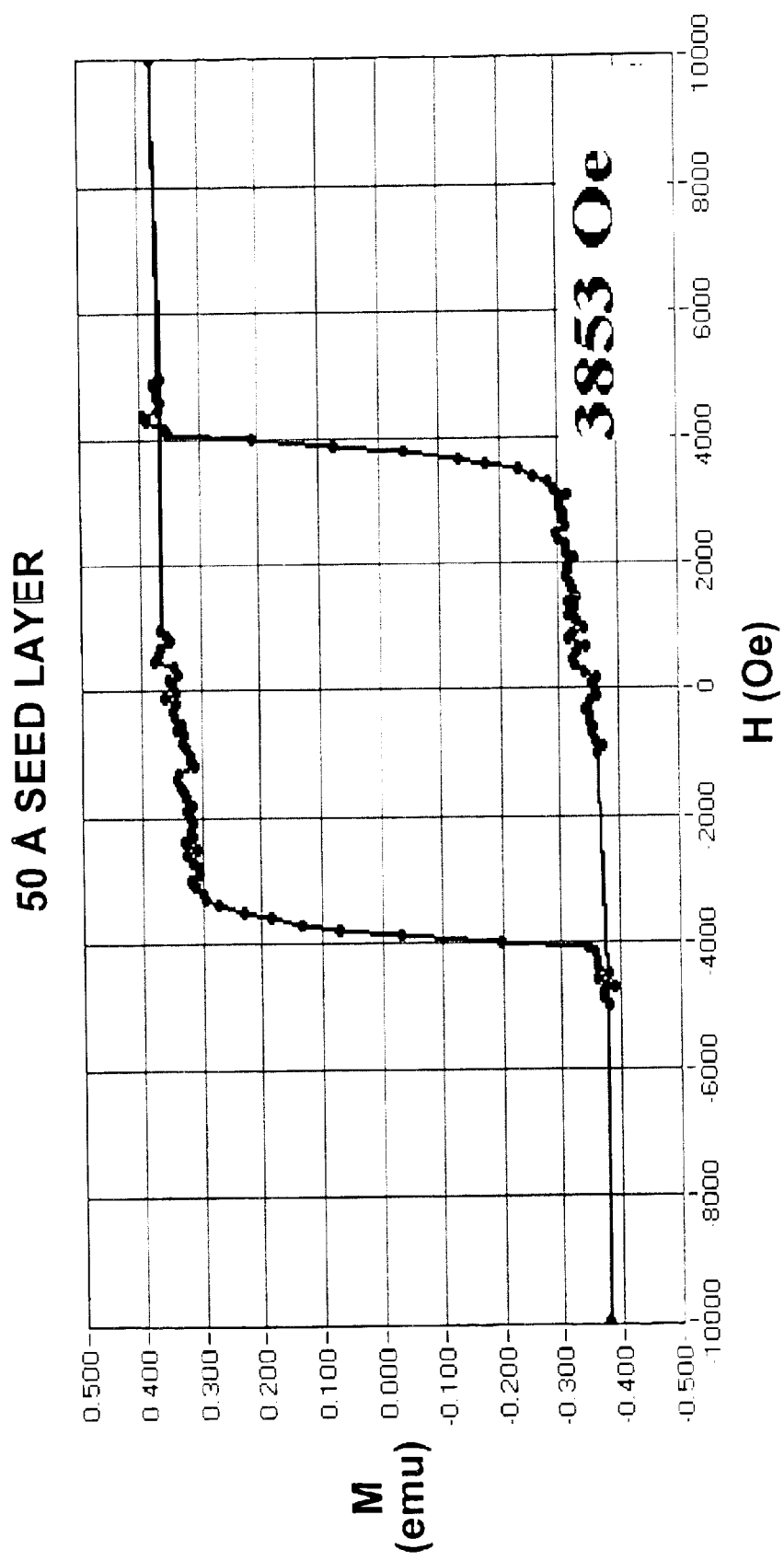
Figure 12:
Figure 13:
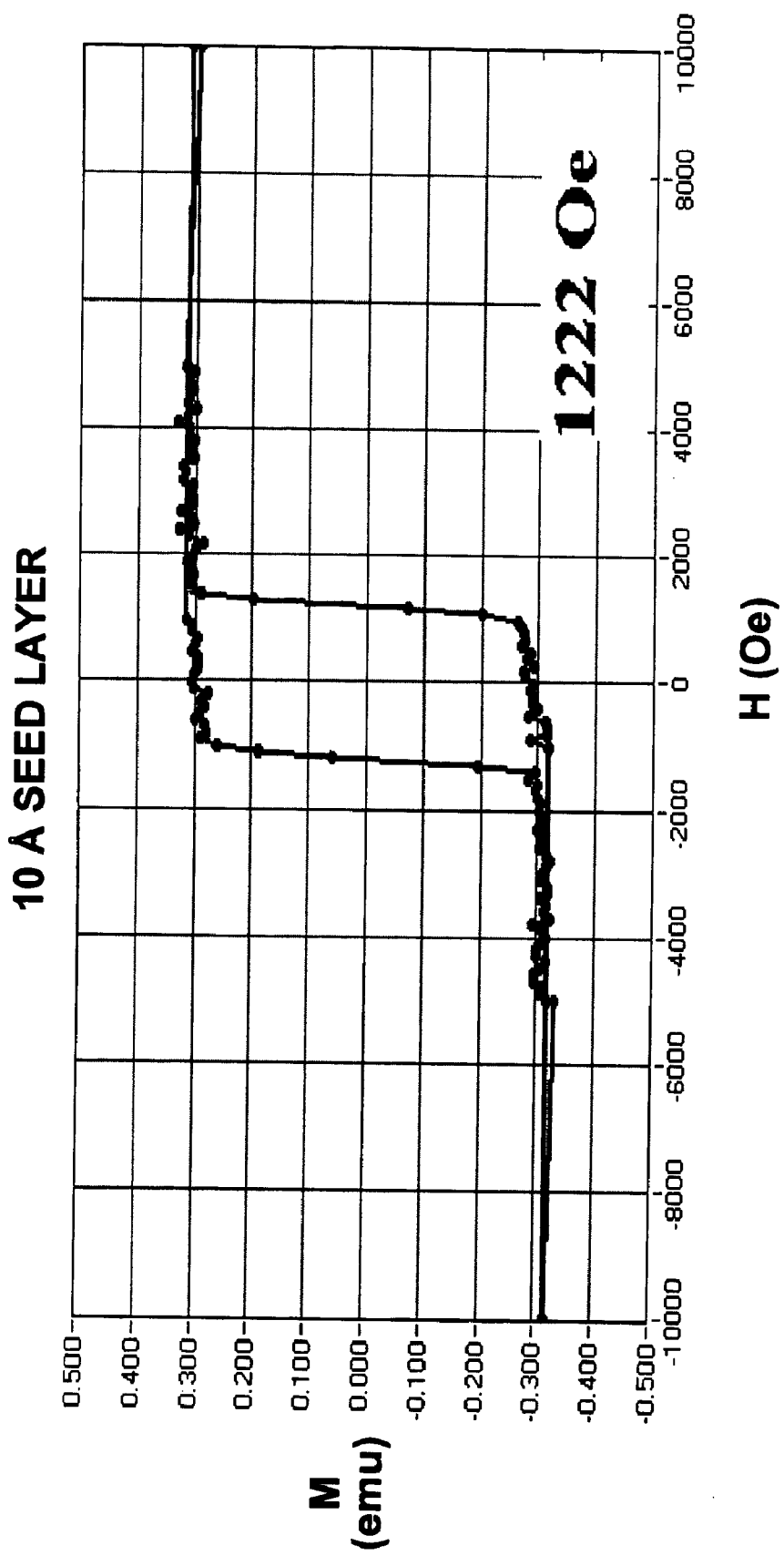
Figure 14:
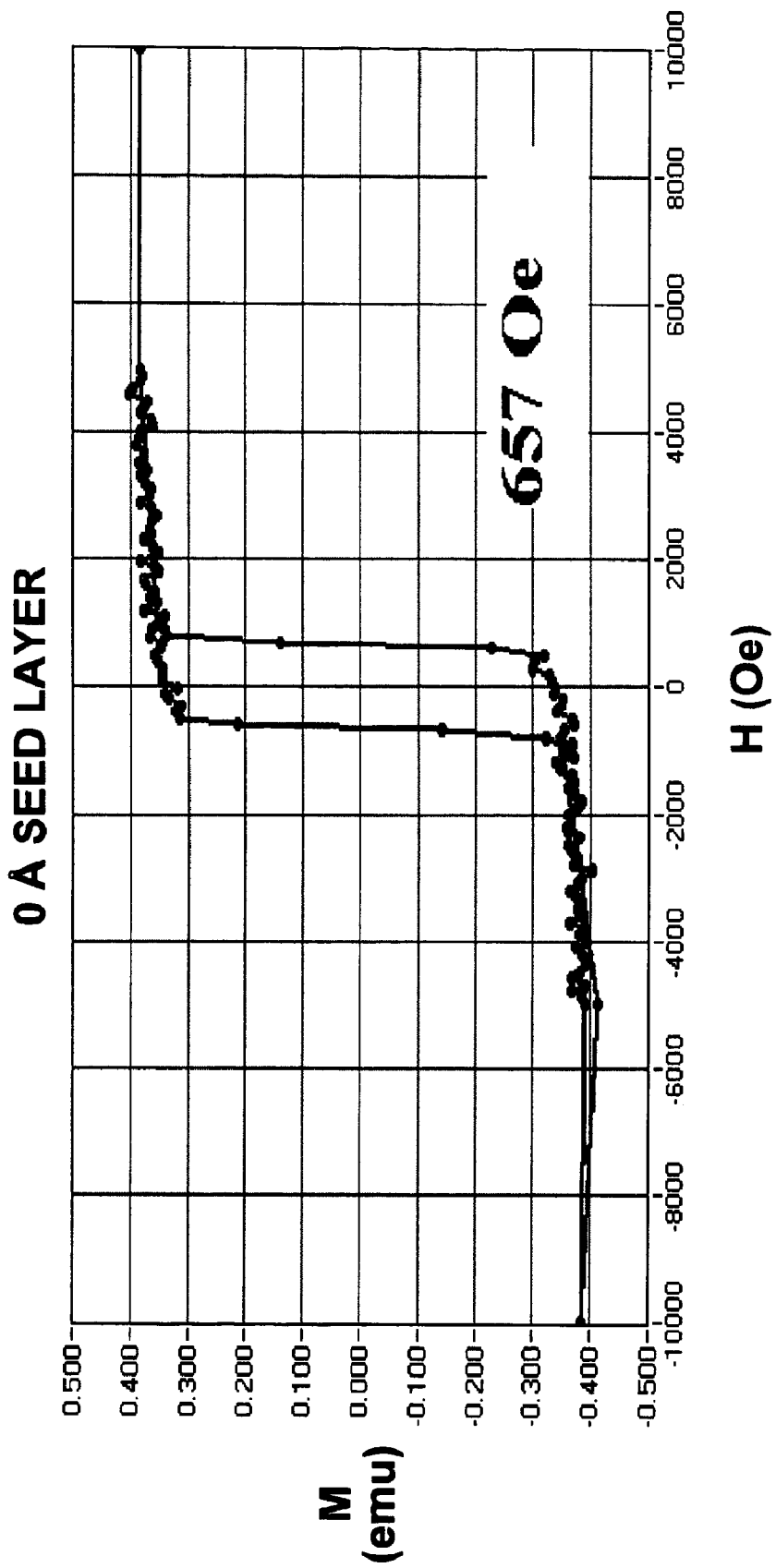

In FIG. 9 the XRD spectra from each of the five samples were offset from each other along both the intensity and the 2θ axis for ease of viewing. The Pt and the NiFeCr peaks are labeled. As can be appreciated by FIG. 9, the Pt FCC (111) peak grows significantly as the NiFeCr seed layer increases.

Example 2

Five flat polycarbonate substrates were mounted onto the planetary sample plattens of the high vacuum sputtering system. The system was pumped to a base pressure of 2.1 E-8 Torr. The substrates were first positioned, in sequence, directly opposite the NiFeCr source and were spun on their own axis while operating the NiFeCr source at pre-calibrated powers and times to deposit NiFeCr layer thicknesses of 0, 10, 25, 50, and 400 Å on the respective substrates. The Ar pressure during the NiFeCr depositions was 2 mT. The NiFeCr composition was: 43 atomic percent Ni, 11 atomic percent Fe, and 46 atomic percent Cr. Each of the five substrates was then positioned, in sequence, directly opposite the Pt source and spun on their respective axis while operating the Pt source using a pre-calibrated power and time to achieve a 50 Å Pt layer thickness on each of the substrates. The Ar pressure during deposition of the Pt layers was 2 mT.

A magnetic (Co/Pt) multi-layer including 9 periods of alternating Co and Pt layers was then deposited on all of the substrates by operating the major axis of the planetary at 0.12 rev/sec and the minor axis of the planetary at 2.89 rev/sec, while operating the two Co sources and the two Pt sources at pre-calibrated powers and times to achieve a Co layer thickness of 3.5 Å per period and a Pt layer thickness of 10 Å per period. The Ar pressure during coating of the Co/Pt multi-layer was 40 mT. Finally a carbon hardcoat was deposited on all of the samples at a major axis speed of 0.4 rev/sec and minor axis speed of 3.2 rev/sec while the C source was operated at a pre-calibrated power and time to result in a layer thickness of 60 Å.

The resulting sample construction was: substrate |NiFeCr|50 Å Pt|9×(3.5/10) Å (Co/Pt) multi-layer|60 Å C. M(H) measurements were made on each of the five samples with a VSM and the resulting M(H) loops are displayed in FIGS. 10–14. In FIGS. 10–14, the units of measurement in the X axis are Oersteds and the units of measurement in the Y axis are electromagnetic units (EMU). The NiFeCr seed layer thickness and the coercivity are labeled with each corresponding M(H) loop. The medium associated with FIG. 10 exhibited a coercivity of 5521 Oersteds. The medium associated with FIG. 11 exhibited a coercivity of 3853 Oersteds. The medium associated with FIG. 12 exhibited a coercivity of 3287 Oersteds. The medium associated with FIG. 13 exhibited a coercivity of 1222 Oersteds, and the medium associated with FIG. 14 exhibited a coercivity of 657 Oersteds.

Example 3

Five flat polycarbonate substrates were mounted onto the planetary sample plattens of the high vacuum sputtering system. The system was pumped to a base pressure of 1.9 E-8 Torr. Each of the five substrates were first positioned, in sequence, directly opposite the NiFeCr source and were spun on their own axis while operating the NiFeCr source at a pre-calibrated power and time to deposit a layer thickness of 25 Å of NiFeCr on each of the substrates. The Ar pressure during the NiFeCr depositions was 2 mT. The NiFeCr composition was: 43 atomic percent Ni, 11 atomic percent Fe, and 46 atomic percent Cr. Each of the five substrates were then positioned, in sequence, directly opposite the Pt source and were spun on their respective axis while operating the Pt source using pre-calibrated powers and times to achieve Pt layer thicknesses of 0, 10, 25, 50, and 200 Å on the respective samples. The Ar pressure during deposition of the Pt layers was 2 mT.

A magnetic (Co/Pt) multi-layer including 9 periods of alternating Co and Pt layers was then deposited on all of the substrates by operating the major axis of the planetary at 0.12 rev/sec and the minor axis of the planetary at 2.89 rev/sec, while operating the two Co sources and the two Pt sources at pre-calibrated powers and times to achieve a Co layer thickness of 3.5 Å per period and a Pt layer thickness of 10 Å per period. The Ar pressure during coating of the Co/Pt multi-layer was 40 mT. Finally a carbon hardcoat was deposited on all of the samples at a major axis speed of 0.4 rev/sec and minor axis speed of 3.2 rev/sec while the C source was operated at a pre-calibrated power and time to result in a layer thickness of 60 Å. The resulting sample construction was: substrate Å25 Å NiFeCr |Pt|9×(3.5/10) Å (Co/Pt) multi-layer 60 Å C.

Figure 15:
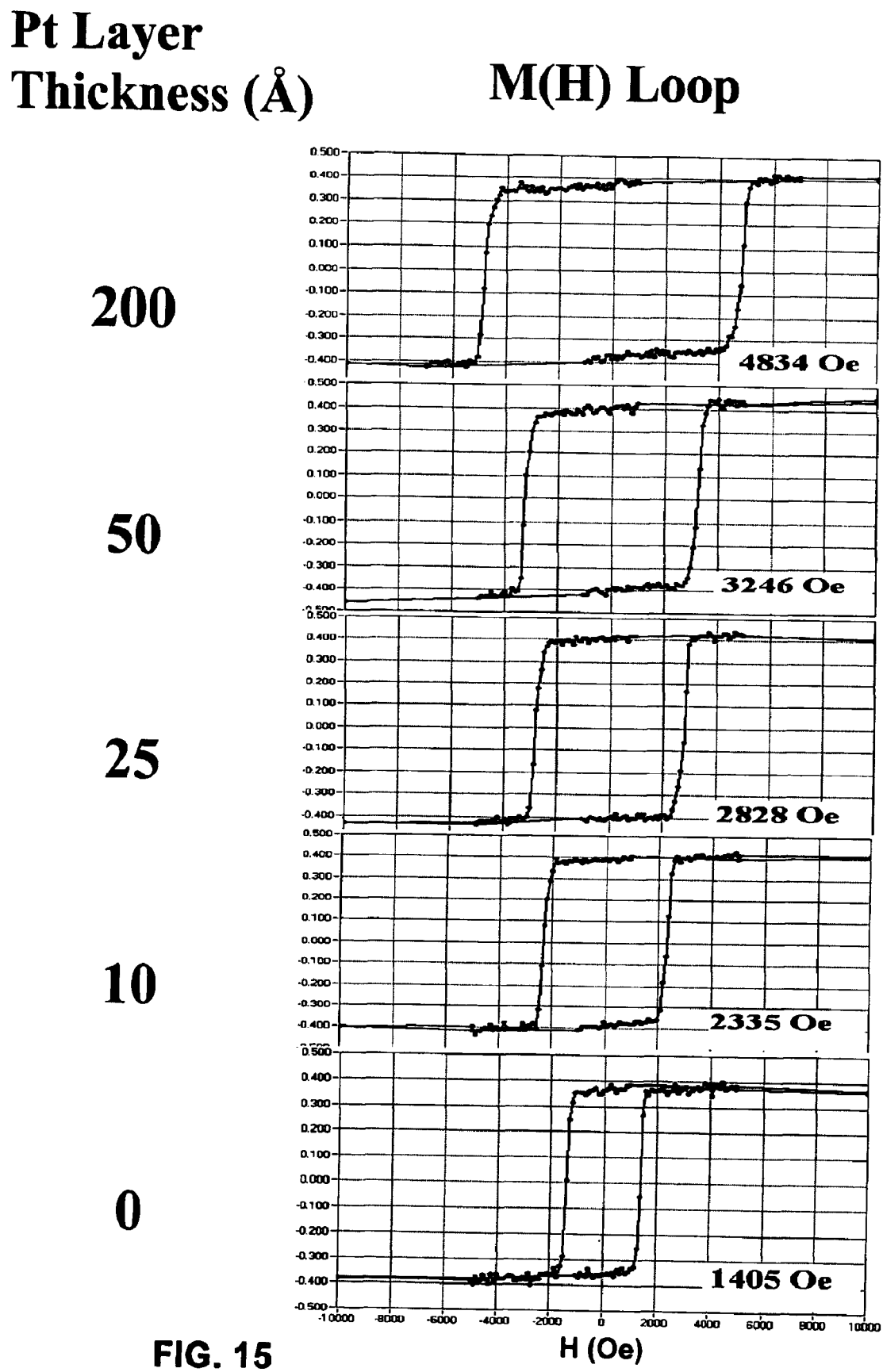
FIG. 15 is a set of graphs illustrating hysteresis curves of media according to embodiments of the invention.

M(H) measurements were made on each of the five samples with a VSM. The resulting M(H) loops for each sample are displayed in FIG. 15. In FIG. 15, the Pt layer thickness and the coercivity are displayed along with each corresponding M(H) loop. For each M(H) loop of FIG. 15, the units of measurement in the X axis are Oersteds and the units of measurement in the Y axis are electromagnetic units (EMU). As shown in FIG. 15, the medium having a 200 Å Pt layer exhibited a coercivity of 4834 Oersteds, and the medium having a 50 Å Pt layer exhibited a coercivity of 3246 Oersteds. The medium having a 25 Å Pt layer exhibited a coercivity of 2828 Oersteds, and the medium having a 10 Å, Pt layer exhibited a coercivity of 2335 Oersteds. The medium having no Pt layer, i.e., a 0 Å Pt layer exhibited a coercivity of 1405 Oersteds.

Various embodiments of the invention have been described. For instance, a number of different embodiments of perpendicular magnetic media have been described. Nevertheless, modifications may be made without departing from the scope of the invention. Accordingly, other embodiments are within the scope of the following claims.

What is claimed is:

1. A magnetic medium comprising:
    a substrate;
    a first seed layer formed over the substrate, the first seed layer including a nickel-iron-chromium alloy comprising greater than approximately 30 atomic percent chromium;
    a second seed layer comprising one of platinum or palladium formed directly on the first seed layer; and
    a multi-layered magnetic stack formed directly on the second seed layer and exhibiting perpendicular magnetic anisotropy, wherein the multi-layered magnetic stack includes a plurality of layers each having a thickness of less than or equal to approximately 3 nanometers.

2. The magnetic medium of claim 1, wherein the multi-layered magnetic stack includes pairs of alternating layers of platinum and cobalt.

3. The magnetic medium of claim 2, wherein the second seed layer comprises platinum.

4. The magnetic medium of claim 2, wherein the layers of platinum in the multi-layered stack define a thickness between approximately 0.5 and 2.5 nanometers, and wherein the layers of cobalt in the multi-layered stack define a thickness between approximately 0.15 and 1.0 nanometers.

5. The magnetic medium of claim 2, wherein the number of pairs of alternating layers of platinum and cobalt is between 5 and 50 inclusive.

6. The magnetic medium of claim 1, wherein the multi-layered magnetic stack includes pairs of alternating layers of palladium and cobalt.

7. The magnetic medium of claim 6, wherein the second seed layer comprises palladium.

8. The magnetic medium of claim 6, wherein the layers of palladium in the multi-layered stack define a thickness between approximately 0.3 and 1.8 nanometers, and wherein the layers of cobalt in the multi-layered stack define a thickness between approximately 0.15 and 1.0 nanometers.

9. The magnetic medium of claim 6, wherein the number of pairs of alternating layers of palladium and cobalt in the multi-layered stack is between 5 and 50 inclusive.

10. The magnetic medium of claim 1, wherein the substrate includes plastic.

11. A magnetic medium comprising:
    a substrate;
    a first seed layer formed over the substrate, the first seed layer including a nickel-chromium alloy comprising greater than approximately 30 atomic percent chromium;
    a second seed layer comprising one of platinum or palladium formed directly on the first seed liver; and
    a multi-layered magnetic stack formed directly on the second seed layer and exhibiting perpendicular magnetic anisotropy, wherein the multi-layered magnetic stack includes a plurality of layers each having a thickness of less than or equal to approximately 3 nanometers, wherein the first seed layer defines a thickness between approximately 2 and 10 nanometers.

12. The magnetic medium of claim 11, wherein the first seed layer defines a thickness of approximately 2.5 nanometers.

13. The magnetic medium of claim 11, wherein the first seed layer includes approximately 60 atomic percent nickel and approximately 40 atomic percent chromium.

14. The magnetic medium of claim 1, wherein the first seed layer defines a thickness between approximately 1 and 40 nanometers.

15. The magnetic medium of claim 14, wherein the first seed layer defines a thickness between approximately 2 and 10 nanometers.

16. The magnetic medium of claim 15, wherein the first seed layer defines a thickness of approximately 2.5 nanometers.

17. The magnetic medium of claim 1, wherein the first seed layer comprises greater than approximately 10 atomic percent iron.

18. The magnetic medium of claim 17, wherein the first seed layer comprises approximately 43 atomic percent nickel, approximately 11 atomic percent iron, and approximately 46 atomic percent chromium.

19. A magnetic storage device comprising:
    a magnetic storage medium;
    a head to detect magnetic domains on the medium;
    a controller that controls a position of the head relative to the medium; and
    a signal processor that interprets detected magnetic domains, wherein the magnetic storage medium includes a substrate, a first seed layer formed over the substrate that includes a nickel-iron-chromium alloy comprising greater than approximately 30 atomic percent chromium, a second seed layer comprising one of platinum or palladium formed directly on the first seed layer; and a multi-layered magnetic stack formed directly on the second seed layer and exhibiting perpendicular magnetic anisotropy.

20. A method comprising:
    forming a first seed layer over a substrate, wherein the first seed layer comprises a nickel-iron-chromium alloy comprising greater than approximately 30 percent chromium;
    forming a second seed layer directly on the first seed layer, the second seed layer including one of platinum or palladium; and
    forming a multi-layered magnetic stack directly on the second seed layer to exhibit perpendicular magnetic anisotropy.

21. The method of claim 20, further comprising forming the first seed layer over a plastic substrate.

* * * * *